(12) United States Patent
Okada

(10) Patent No.: US 8,645,768 B2
(45) Date of Patent: Feb. 4, 2014

(54) DISPLAY SCREEN CONTROL DEVICE, DISPLAY SCREEN CONTROL METHOD, AND COMPUTER READABLE MEDIUM

(75) Inventor: Tatsunori Okada, Takatsuki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 354 days.

(21) Appl. No.: 13/051,202

(22) Filed: Mar. 18, 2011

(65) Prior Publication Data

US 2011/0239060 A1 Sep. 29, 2011

(30) Foreign Application Priority Data

Mar. 23, 2010 (JP) ................................. 2010-065693

(51) Int. Cl.
*G06F 11/00* (2006.01)
(52) U.S. Cl.
USPC ............................................................ 714/48
(58) Field of Classification Search
USPC ............................................ 714/48; 348/246
See application file for complete search history.

(56) References Cited

U.S. PATENT DOCUMENTS

| | | | | | |
|---|---|---|---|---|---|
| 4,819,025 | A | * | 4/1989 | Takahashi et al. | 399/32 |
| 5,262,872 | A | * | 11/1993 | Yoshimura et al. | 358/296 |
| 6,233,708 | B1 | * | 5/2001 | Hindelang et al. | 714/747 |
| 6,594,697 | B1 | | 7/2003 | Praitis et al. | |
| 6,707,493 | B1 | * | 3/2004 | Lee et al. | 348/246 |
| 7,675,639 | B2 | * | 3/2010 | Shimizu | 358/1.14 |
| 8,161,339 | B2 | * | 4/2012 | Furukawa et al. | 714/746 |
| 2002/0012046 | A1 | | 1/2002 | Ishino | |
| 2004/0103143 | A1 | | 5/2004 | Chikada et al. | |
| 2006/0080571 | A1 | | 4/2006 | Ichinowatari | |
| 2006/0152605 | A1 | * | 7/2006 | Okazaki | 348/246 |
| 2006/0215057 | A1 | * | 9/2006 | Tanaka | 348/448 |

(Continued)

FOREIGN PATENT DOCUMENTS

CN 101059804 A 10/2007
EP 1 874 025 A2 1/2008

(Continued)

OTHER PUBLICATIONS

Extended European Search Report dated Jul. 20, 2011, issued in the corresponding European Patent Application No. 11158441.3. (6 pages).

(Continued)

*Primary Examiner* — Amine Riad
(74) *Attorney, Agent, or Firm* — Buchanan Ingersoll & Rooney PC

(57) ABSTRACT

A display screen control device comprises: a browser for acquiring a display screen from the web server and displaying on a predetermined display part; an error detection part for detecting whether or not a display error of an image contained in the display screen acquired by the browser is occurred with the display screen being displayed on the display part when instructions on execution of a job given by the user is detected; a confirmation screen creation part for creating a setting confirmation screen including a set value of each of at least one set item corresponding to the image in which the display error is detected when the display error is detected; and a screen change part for changing the display screen displayed on the display part to the setting confirmation screen created by the confirmation screen creation part prior to start of execution of the job.

21 Claims, 12 Drawing Sheets

(56) References Cited

U.S. PATENT DOCUMENTS

| | | | |
|---|---|---|---|
| 2006/0232812 A1* | 10/2006 | Shimizu | 358/1.14 |
| 2007/0294595 A1* | 12/2007 | Rai et al. | 714/48 |
| 2008/0222462 A1* | 9/2008 | Sakata | 714/704 |
| 2010/0053674 A1 | 3/2010 | Kano | |
| 2011/0047403 A1* | 2/2011 | Seki et al. | 713/503 |
| 2013/0055035 A1* | 2/2013 | Nakatsu | 714/48 |

FOREIGN PATENT DOCUMENTS

| | | |
|---|---|---|
| JP | 7-020976 A | 1/1995 |
| JP | 11(1999)-306067 A | 11/1999 |
| JP | 2001-265545 A | 9/2001 |
| JP | 2001-345983 A | 12/2001 |
| JP | 2002-268996 A | 9/2002 |
| JP | 2007-196461 A | 8/2007 |
| JP | 2010-039663 A | 2/2010 |

OTHER PUBLICATIONS

Decision to Grant a Patent issued Dec. 20, 2011, in corresponding Japanese Patent Application No. 2010-065693, with an English translation thereof.

First Notice of the Opinion on Examiniation issued Mar. 22, 2012, in corresponding Chinese Patent Application No. 201110049475.6, with an English translation thereof.

\* cited by examiner

FIG. 8

IMAGE DETERMINATION INFORMATION 33

| IMAGE ID | ATTRIBUTE VALUE |
|---|---|
| ID=1 | 1 |
| ID=2 | 1 |
| ID=3 | 1 |
| ID=4 | 0 |
| ⋮ | ⋮ |

DISPLAY SCREEN CONTROL DEVICE, DISPLAY SCREEN CONTROL METHOD, AND COMPUTER READABLE MEDIUM

This application is based on the application No. 2010-065693 filed in Japan, the contents of which are hereby incorporated by reference.

BACKGROUND OF THE INVENTION

1. Field of the Invention

The present invention relates to a display screen control device, a display screen control method, and a computer readable medium. The present invention more specifically relates to a technique of acquiring a display screen from a web server and displaying.

2. Description of the Background Art

In recent years, image processing devices called as digital complex devices or MFPs (multi function peripherals) include a browser to browse web pages. The browser acquires a display screen to display on an operational panel from a web server connected through a network and displays. This known technique is introduced for example in Japanese Patent Application Laid-Open No. JP2010-39663 A. According to the above-described configuration of display, for example, information such as at least one set item allowed to be set in the image processing device and a set value corresponding to each of the set item is contained in the display screen acquired from the web server as an image.

For the above-described configuration of display, when, for example, a heavy load is placed on the web server or a network, some or all of the images contained in the display screen are sometimes not displayed on the operational panel. In the state of the display, the user is not allowed to see what the image not being displayed on the operational panel is about, and the user is not capable of checking the set value. If execution of a job such as copy is started with the display, the output may not be produced in a manner that the user satisfies.

It is assumed some images contained in the display screen are not displayed on the operational panel. In such a case, the user may again acquire the display screen from the web server by making operation to an update button to again display with a function of the browser. When a heavy load is placed on the web server or the network, however, all images contained in the display screen may not always be acquired normally even if the display screen is again acquired from the web server. So, the update button may be required to be operated several times until all images to be displayed normally. Extremely long time is taken until the set value corresponding to each of set items to be checked, and the operation is troublesome.

SUMMARY OF THE INVENTION

The present invention is intended to solve the extent problem described above. Thus, the present invention is intended to provide a display screen control device, a display screen control method and a computer readable medium capable of enabling a set value of each of at least one set item corresponding to an image contained in a display screen acquired from a web server to be checked without another acquisition of the display screen from the web server when the image is not displayed normally.

First, the present invention is directed to a display screen control device.

According to one aspect of the display screen control device, the display screen control device, comprises: a display part for displaying various types of information; a manipulation input part for detecting variety of input operations made by a user; a communication part for performing data communication with a web server; a browser for acquiring a display screen from the web server via the communication part and displaying the acquired display screen on the display part; an error detection part for detecting whether or not a display error of an image contained in the display screen acquired from the web server by the browser is occurred with the display screen being displayed on the display part when an instruction on execution of a job given by the user is detected by the manipulation input part; a confirmation screen creation part for creating a setting confirmation screen including a set value of each of at least one set item corresponding to the image in which the display error is detected when the display error is detected by the error detection part; and a screen change part for changing the display screen displayed on the display part from the display screen displayed by the browser to the setting confirmation screen created by the confirmation screen creation part prior to start of execution of the job.

Second, the present invention is directed to a display screen control method.

According to one aspect of the method, the method comprises the steps of: (a) acquiring a display screen from a web server connected through a network and displaying the acquired display screen on a predetermined display part; (b) detecting whether or not an instruction on execution of a job is given based on input operation made by a user; (c) detecting whether or not a display error of an image contained in the display screen acquired from the web server is occurred with the display screen being displayed on the display part when the instruction on execution of the job given by the user is detected; (d) creating a setting confirmation screen including a set value of each of at least one set item corresponding to the image in which the display error is detected when the display error of the image contained in the display screen is detected; and (e) changing the display screen displayed on the display part from the display screen acquired from the web server to the setting confirmation screen.

Third, the present invention is directed to a computer-readable recording medium on which a program is recorded.

According to an aspect of the computer-readable recording medium, the program recorded on the recording medium causes a computer to execute the steps of: (a) acquiring a display screen from a web server connected through a network and displaying the acquired display screen on a predetermined display part; (b) detecting whether or not an instruction on execution of a job is given based on input operation made by a user; (c) detecting whether or not a display error of an image contained in the display screen acquired from the web server is occurred with the display screen being displayed on the display part when the instruction on execution of the job given by the user is detected; (d) creating a setting confirmation screen including a set value of each of at least one set item corresponding to the image in which the display error is detected when the display error of the image contained in the display screen is detected; and (e) changing the display screen displayed on the display part from the display screen acquired from the web server to the setting confirmation screen.

BRIEF DESCRIPTION OF THE DRAWINGS

FIG. 8 shows an example of image determination information referred at error determination;

DESCRIPTION OF THE PRESENT PREFERRED EMBODIMENTS

Figure 1:
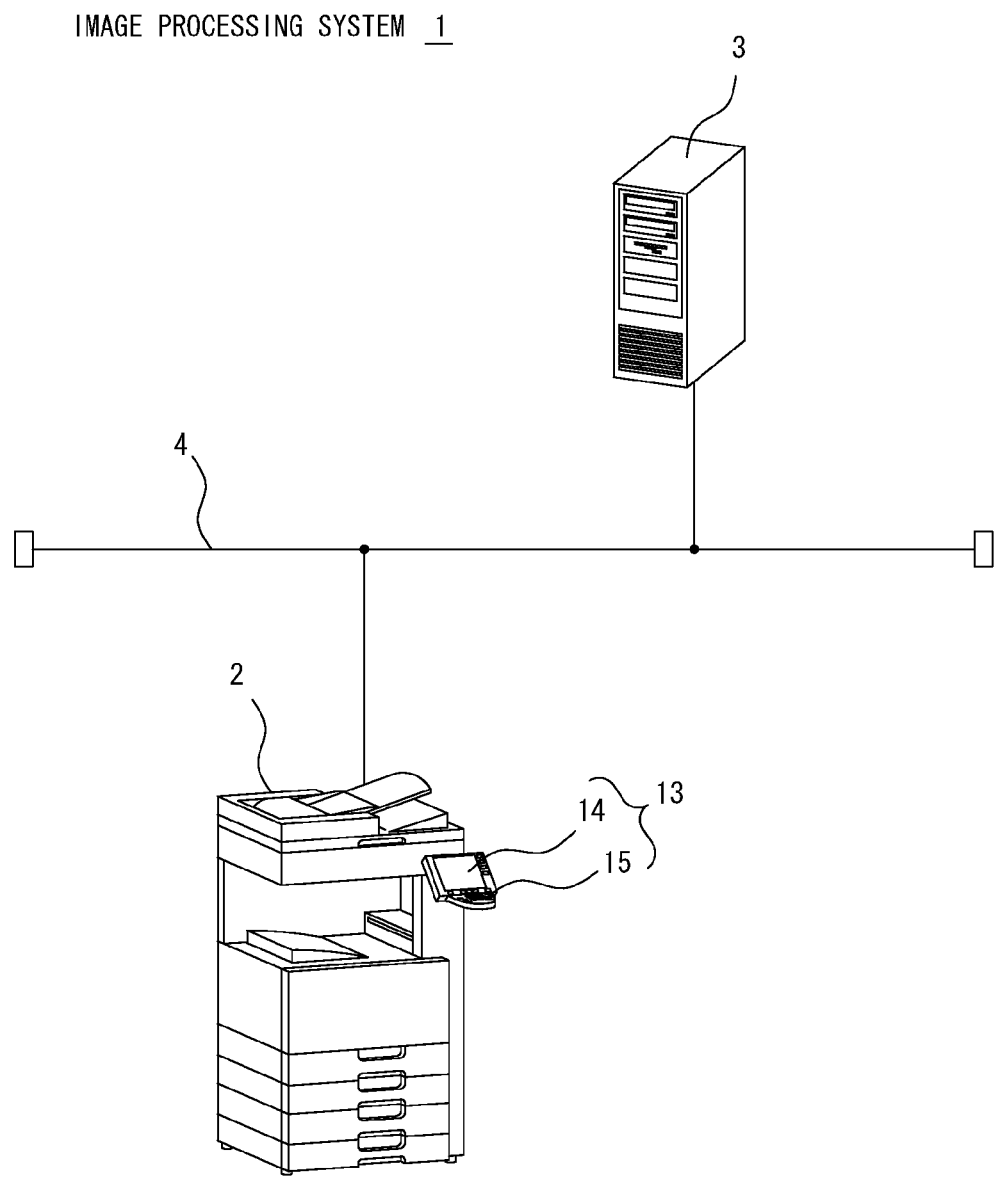
FIG. 1 shows an exemplary configuration of an image processing system.

Present preferred embodiments of the present invention are described in detail below with reference to figures. In the description given below, those elements which are shared in common among figures are represented by the same reference numerals, and these elements are not discussed repeatedly for the same description.

FIG. 1 shows an exemplary configuration of an image processing system 1 to which the present preferred embodiment is applied. The image processing system 1 comprises an image processing device 2 called as a name such as a digital complex device or an MFP (multi function peripherals) and a web server device 3 connected through a network 4. The network 4 may be, for example, LAN established in an office environment or a network including an internet and others.

The image processing device 2 has several functions such as a copy function, a scanner function, a printer function and a fax function, and executes a job corresponding to the respective functions. The image processing device 2, however, should not always be a device having several functions. The image processing device 2 may be a single-function device such as a copier, a scanner, a printer or a fax machine.

The image processing device 2 is provided with an operational panel 13 which is a user interface when operated by a user. The operational panel 13 includes a display unit 14 on which various types of information are displayed and a manipulation input unit 15 which detects variety of entry operations made by the user. The display unit 14 is formed from a device such as a color liquid crystal display, for instance. The manipulation input unit 15 has a plurality of operation keys including both touch panel keys arranged on a screen of the display unit 14 and push-button keys arranged around the display unit 14. The image processing device 2 acquires a display screen to display on the display unit 14 from the web server 3 through the network 4 and displays the acquired display screen on the display unit 14.

The web server 3 provides a display screen to be displayed on the display unit 14 of the operational panel 13 to the image processing device 2 with, for example, HTTP (Hypertext Transfer Protocol). The web server 3 stores in advance therein operation screens corresponding to each function of the image processing device 2. The web server 3 creates a display screen showing a current set value reflected to one of the operation screens based on a request for screen from the image processing device 2, and transmits the created display screen to the image processing device 2.

Figure 2:
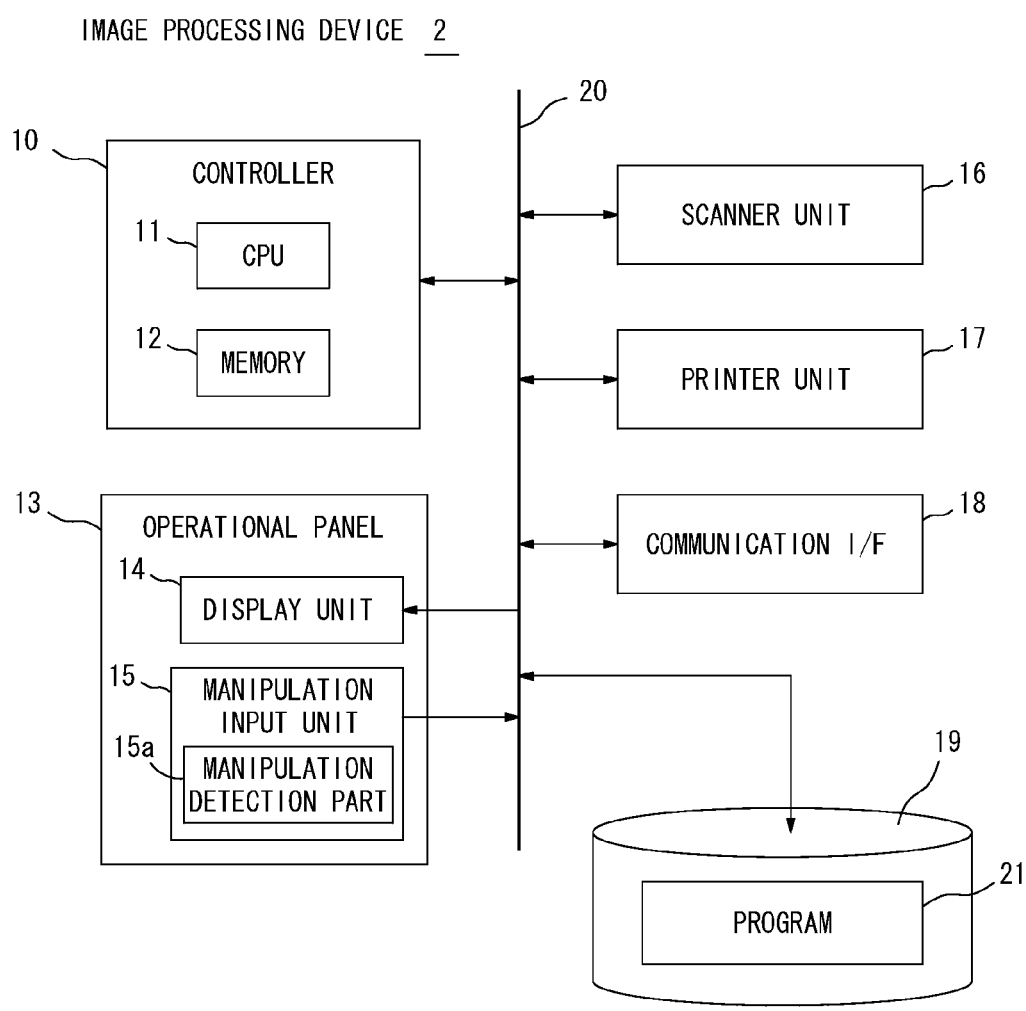
FIG. 2 is a block diagram showing the hardware configuration of an image processing device.

FIG. 2 is a block diagram showing the hardware configuration of the image processing device 2. The image processing device 2 includes a controller 10, the operational panel 13, a scanner unit 16, a printer unit 17, a communication interface 18 and a storage device 19 that are connected to each other to allow data input and output between these parts through a data bus 20.

The controller 10 includes a CPU 11 and a memory 12. The controller 10 controls operations of respective parts, the operational panel 13, the scanner unit 16, the printer unit 17, the communication interface 18 and the storage device 19. In the present preferred embodiment, the CPU 11 reads and executes a program 21 stored in the storage device 19, thereby realizing a function as a display screen control device controls the display screen displayed on the display unit 14 of the operational panel 13. The memory 12 stores data therein such as temporary data when the CPU 11 executes process based on the program 21.

The display unit 14 of the operational panel 13 displays the display screen received from the controller 10 through the data bus 20. The manipulation input unit 15 includes a manipulation detection part 15a for detecting operation made by the user. As detecting the operation made by the user, the manipulation detection part 15a outputs a detecting signal to the controller 10.

The scanner unit 16 operates based on instructions from the controller 10 when a job of a function such as the copy function, the scanner function and the fax transmission function is executed in the image processing device 2. To be more specific, the scanner unit 16 generates image data by reading an original and outputs.

The printer unit 17 operates based on instructions from the controller 10 when a job of a function such as the copy function, the printer function and the fax receiving function is executed in the image processing device 2. To be more specific, the printer unit 17 forms an image on a printing medium such as a printing sheet based on received image data, and produces a printed matter.

The communication interface 18 is for connecting the image processing device 2 to the network 4. The controller 10 performs data communication with the web server 3 via the communication interface 18, thereby acquiring the display screen from the web server 3.

The storage device 19 is formed from a nonvolatile storage device such as a hard disk drive, for example. The storage device 19 stores therein the program 21 installed in advance. The program 21 is executed by the CPU 11 of the controller 10 as described above. The program 21 includes a browser program for acquiring the display screen from the web server 3 and displaying on the display unit 14.

Figure 3:
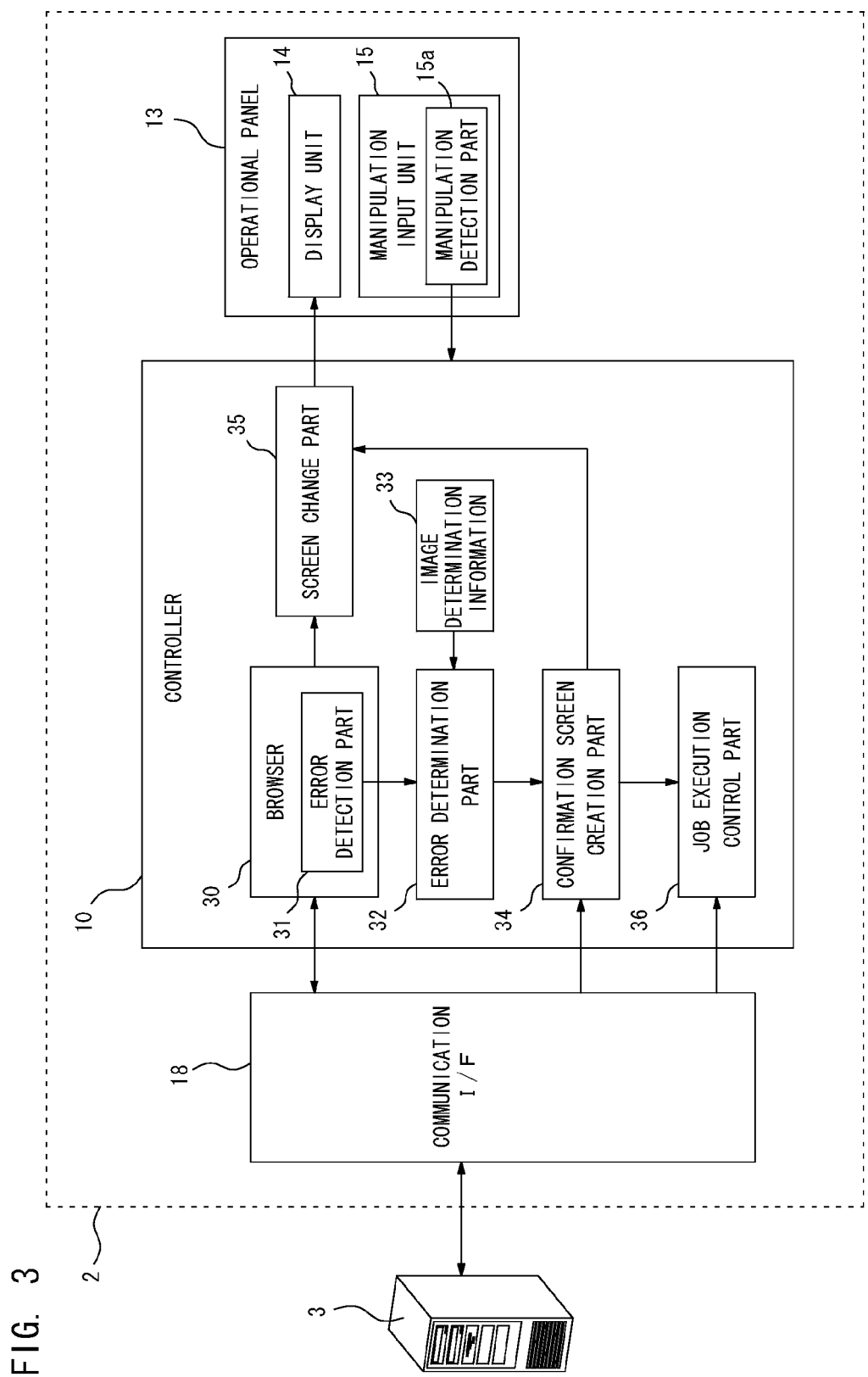
FIG. 3 is a block diagram showing the detailed functional configuration realized when the image processing device functions as a display screen control device by execution of a program by a CPU of a controller.

FIG. 3 is a block diagram showing the detailed functional configuration realized when the image processing device 2 functions as the display screen control device by execution of the program 21 by the CPU 11 of the controller 10. As shown in FIG. 3, the controller 10 functions as a browser 30, an error determination part 32, a confirmation screen creation part 34, a screen change part 35 and a job execution control part 36.

The browser 30 acquires the display screen from the web server 3 via the communication interface 18 and displays the acquired display screen on the display unit 14 of the operational panel 13. The screen change part 35 outputs the display screen received from the browser 30 as it is to the display unit 14 of the operational panel 13 in a usual operation state. The usual operation state is a state except for the state in which the error is occurred. As the display screen being acquired from the web server 3 by the browser 30, the display screen thereby acquired is displayed on the display unit 14.

Figure 4:
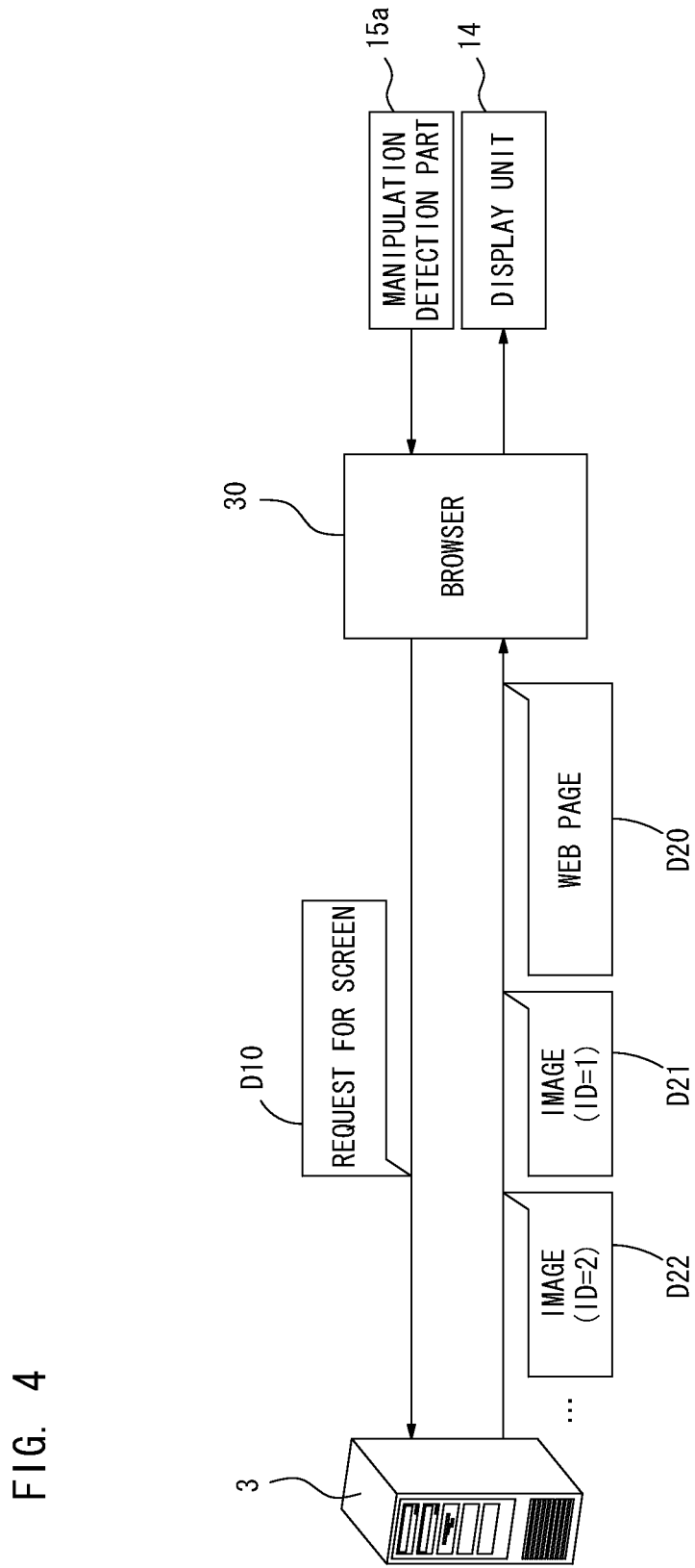
FIG. 4 conceptually shows data communication when a browser acquires a display screen from a web server and displays on a display unit.

FIG. 4 conceptually shows data communication when the browser 30 acquires the display screen from the web server 3 and displays on the display unit 14. As an operation made by the user is detected by the manipulation detection part 15a, the browser 30 sends a request for screen D10 to the web server 3 to acquire the display screen corresponding to the operation made by the user. The web server 3 creates the display screen corresponding to the request for screen D10, and transmits the created display screen to the browser 30. The display screen transmitted from the web server 3 to the browser 30 includes a web page D20 stated in a predetermined language such as HTML (Hypertext Markup Language) and images D21 and D22 in a predetermined data format, for example as shown in FIG. 4. Respective unique IDs are assigned to the images D21 and D22 as identification information. Information such as a display position and a display size associated with the respective IDs is defined in the web page D20. The browser 30 analyzes the web page D20, thereby specifying the information such as the display position and the display size of each image D21 and D22. Based on a result of the specification, the browser 30 lays each image D21 and D22 received from the web server 3 out on the display screen. The browser 30 then outputs and displays the display screen on which each image D21 and D22 is laid out based on the web page D20 on the display unit 14.

Figure 5:
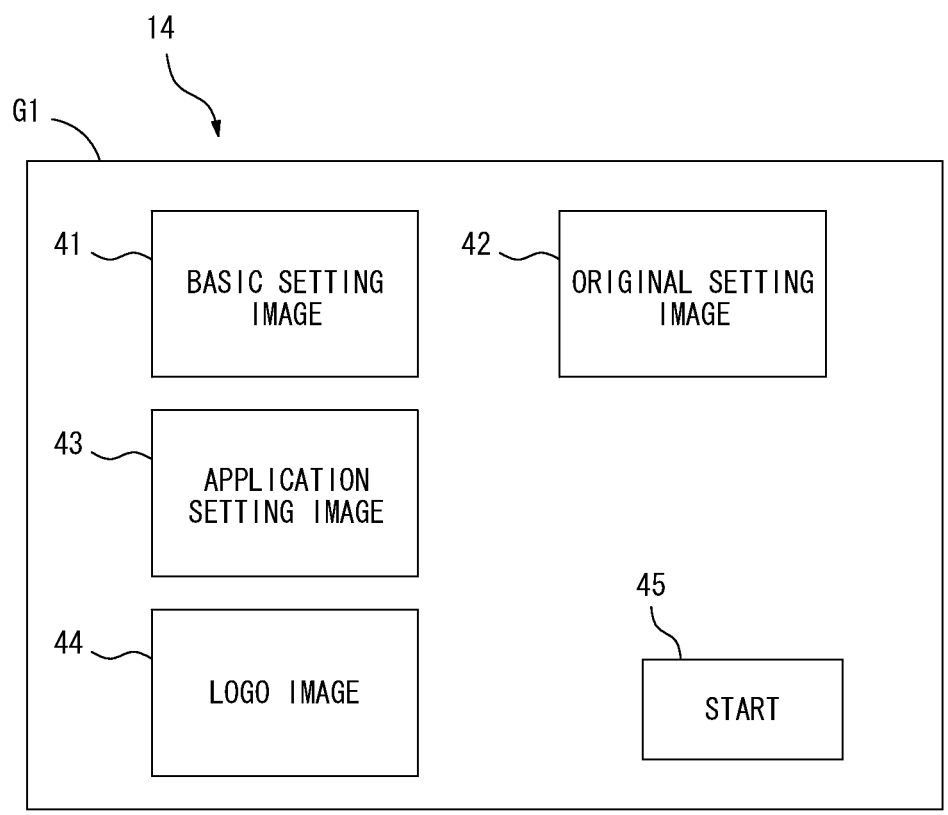
FIG. 5 showing a display screen displayed on the display unit when all images contained in the display screen are received normally by the browser.

FIG. 5 showing a display screen G1 displayed on the display unit 14 by the browser 30 is an example of a display when all images contained in the display screen G1 are received normally. On the display screen G1, a basic setting image 41, an original setting image 42, an application setting image 43, a logo image 44 and a start key 45 are displayed.

The basic setting image 41 is, for example, an bitmap image showing each of at least one set item and the corresponding current set value relating to basic settings for use of the image processing device 2. The user sees the detail of the basic setting image 41 displayed on the display screen G1, so he or she may check the current set value corresponding to each set item relating to the basic settings.

The original setting image 42 is a bitmap image showing each of at least one set item and the corresponding current set value relating to original settings for reading an original. The user sees the original setting image 42 displayed on the display screen G1, so that he or she may check the current set value corresponding to each set item relating to the original settings.

The application setting image 43 is a bitmap image showing each of at least one set item and the corresponding current set value relating to application settings for use of the image processing device 2. The user sees the application setting image 43 displayed on the display screen G1, so that he or she may check the current set value corresponding to each set item relating to the application settings. The application settings include, for instance, finishing settings for print output.

The logo image 44 is a bitmap image showing a logo mark of a company or the like which provides a service using the web server 3, for example. What is different from the basic setting image 41, the original setting image 42 and the application setting image 43 described above is that the logo image 44 does not include information such as the set item and the corresponding current set value.

The start key 45 is also displayed on the display screen G1 as a bitmap image. The start key 45 is an operation key to give instructions for start of execution of the job to the image processing device 2. If, however, the start key is arranged as one of the push-button keys arranged around the display unit 14, the start key 45 is not always necessary to be displayed on the display screen G1.

As shown in FIG. 5, all images contained in the display screen G1 are displayed normally. In this case, the user may see what the set value for each set item is when he or she uses the image processing device 2. The user makes an operation to press the image including a particular set item to change a set value of the set item. This operation is detected by the manipulation detection part 15a, and an operation signal is output from the manipulation detection part 15a to the browser 30. In response to receipt of the operation signal, the browser 30 identifies the image operated by the user. The browser 30 then sends the request for screen D10 to the web server 3 to acquire the display screen for changing the set value of the set item included in the identified image. The web server 3 transmits the display screen for changing the settings. As acquiring the display screen for changing the settings from the web server 3, the browser 30 displays the acquired display screen on the display unit 14.

Figure 6:
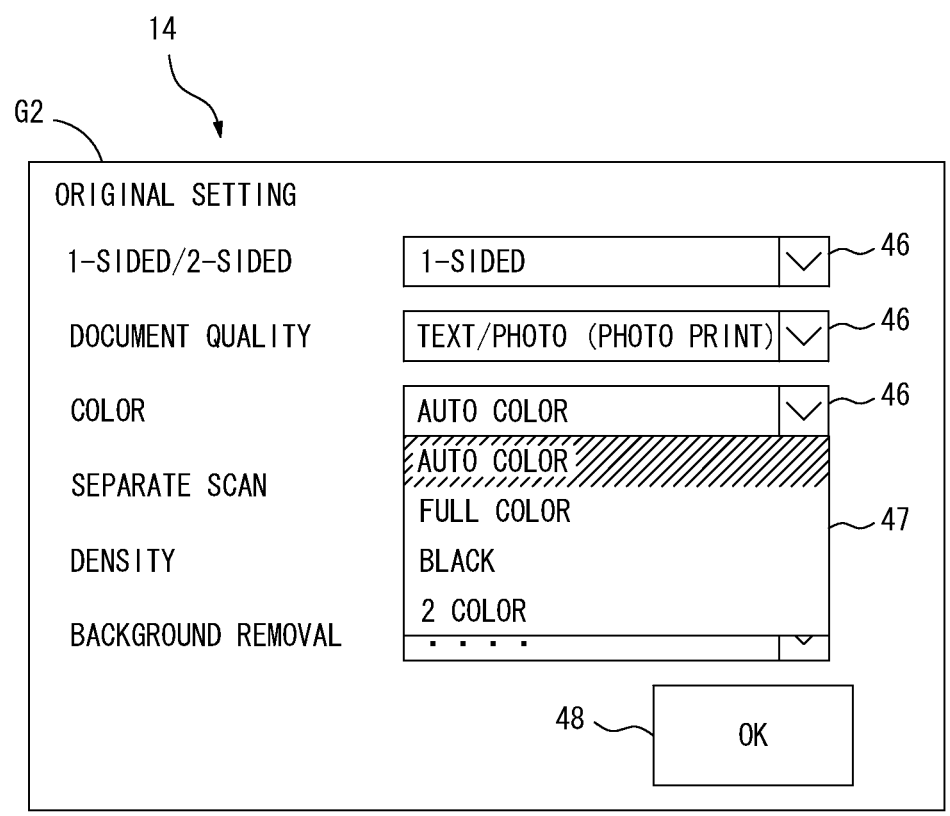
FIG. 6 shows an example of a display screen for changing a set value corresponding to each set item included in an original setting image.

FIG. 6 shows an example of a display screen G2 for changing the set value corresponding to each set item included in the original setting image 42. It is assumed, for example, the user makes an operation to press the original setting image 42 with the display screen G1 shown in FIG. 5 being displayed on the display unit 14. In this case, the browser 30 acquires the display screen G2 of FIG. 6 from the web server 3 and displays the acquired display screen G2 on the display unit 14. The current set value corresponding to each of at least one set item and at least one pull-down key 46 to change the corresponding current set value are displayed on the display screen G2. As the pull-down key 46 is operated, the browser 30 shows a pull-down menu 47 as shown in FIG. 6. The user selects a desired set value from the pull-down menu 47 and changes the set value. The user then presses an OK key 48 to fix the changed set value.

After detecting the OK key 48 of the display screen G2 being pressed, the browser 30 again sends the request for screen D10 to the web server 3. The request for screen D10 sent to the web server 3 includes at least one set value selected by the user. The web server 3 creates the display screen G1 to which the selected set value is reflected, and transmits the created display screen G1 to the browser 30. The browser 30 then transits the display screen displayed on the display unit 14 from the display screen G2 of FIG. 6 to the display screen G1 of FIG. 5. The current set value displayed on the original setting image 42 is shown to be updated to the set value selected by the user. In this case, the user checks the detail shown on the original setting image 42 after making the operation to change the set value. Therefore, the user is capable of knowing whether or not the desired set value is reflected correctly.

It is assumed that a heavy load is placed on the web server 3 or the network 4 at time of sending the request for screen D10 to the web server 3 by the browser 30 as described above. In this case, the browser 30 sometimes does not receive normally all of the images necessary for displaying the display screen G1 as shown in FIG. 5, for example. In such a circumstance, the browser 30 is not allowed to lay each image D21 and D22 out normally based on the web page D20 received from the web server 3. So, an incomplete display screen missing some of the images is displayed on the display unit 14.

Figure 7:
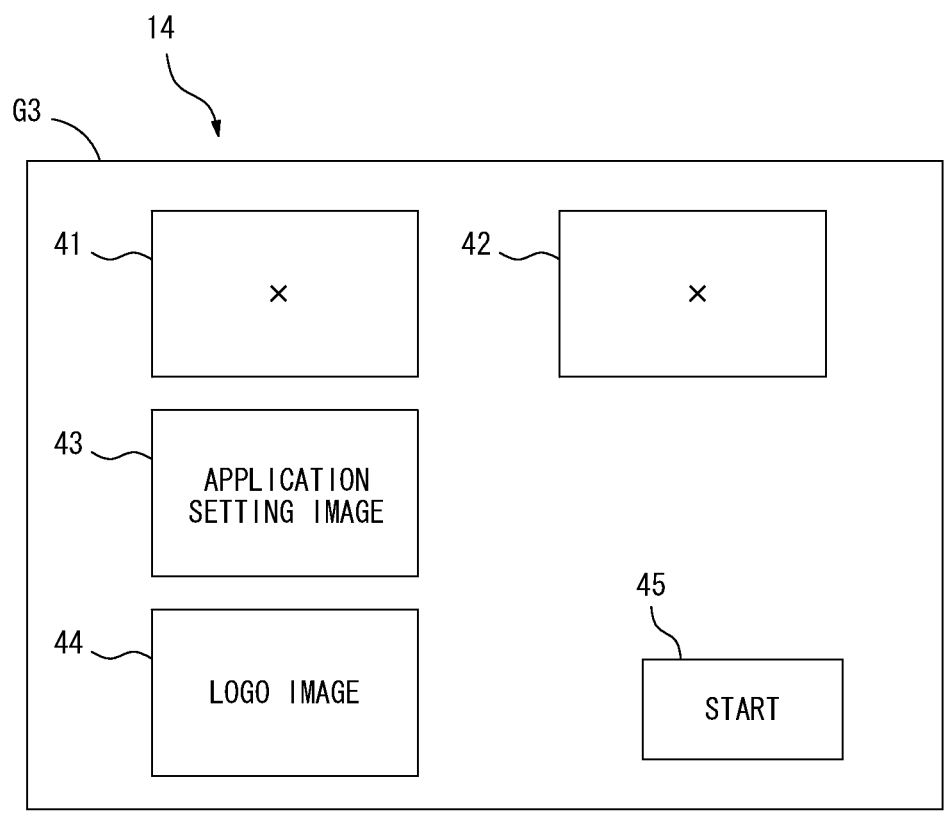
FIG. 7 is a display screen displayed on the display unit when a basic setting image and an original setting image are not received normally by the browser.

FIG. 7 is a display screen G3 displayed on the display unit 14 by the browser 30 showing an example of the display when the basic setting image 41 and the original setting image 42 contained in the display screen G1 of FIG. 5 are not received normally. Because the basic setting image 41 and the original setting image 42 are not received normally by the browser 30, a predetermined mark (for instance, X mark) is displayed in a part where the respective images suppose to be displayed on the display screen G3. To be more specific, the predetermined mark is an error display indicating the user that the image is not displayed normally. This type of error is detected by the browser 30.

More specifically, the browser 30 includes an error detection part 31 for detecting the display error as shown in FIG. 3. The error detection part 31 detects occurrence of the display error of the image contained in the display screen acquired from the web server 3 by the browser 30 with the display screen being displayed on the display unit 14. If, for example, the image is not laid out normally based on the web page D20, the error detection part 31 detects that the image is not displayed normally and the display error is occurred. The error detection part 31 is put into operation as a part of functions of the browser 30. During the activation of the browser 30, the error detection part 31 is capable of detecting occurrence of the display error.

In the present preferred embodiment, with reference to FIG. 7, it is assumed that the start key 45 is pressed by the user while the user is not able to check the set value corresponding to each of set item. In this case, in order to prevent execution of the job to be started without the set value being checked by the user, the error determination part 32, the confirmation screen creation part 34 and the screen change part 35 are put into operation. Each part is put into operation prior to the execution of the job being started. So, the set value corresponding to each set item may be checked by the user. After the set value is checked by the user and the execution of the job is become ready, the job execution control part 36 is put into operation to start the execution of the job. The operation is explained in detail below.

When operation to press the start key 45 is made by the user with the display screen acquired from the web server 3 by the browser 30 being displayed, the error detection part 31 detects whether or not the display error is occurred on the display screen displayed on the display unit 14. The error detection part 31 then outputs a result of the detection to the error determination part 32. When the display error is occurred, the error detection part 31 identifies an ID of the image not being displayed normally on the display unit 14, and reports the identified ID to the error determination part 32.

The error determination part 32 determines occurrence of the display error based on the result of detection received from the error detection part 31. In addition, when the display error is occurred, the error determination part 32 determines the image not being displayed on the display screen (that is the image in which the display error is detected) includes an important set value based on the ID of the image received from the error detection part 31. By way of example, the error determination part 32 determines whether or not the important set value is included in the image in which the display error is detected based on image determination information 33. The image determination information 33 may be information stored in advance in the program 21 or information acquired from the web server 3 periodically or not periodically and stored.

FIG. 8 shows an example of the image determination information 33. The image determination information 33 is table information in which the ID of the image and an attribute value are associated with each other as shown in FIG. 8. The ID of the image is identification information provided individually to the images D21 and D22 transmitted from the web server 3. The attribute value is information showing whether or not the important set item is included in each image. When, for example, the attribute value is "1," it shows that the image includes the important set item. When, for example, the attribute value is "0," it shows that the image does not include the important set item.

In the present preferred embodiment, the attribute value is defined according to the following way; if the image to be displayed on the display unit 14 includes any set item and the corresponding set value, the image is determined as the image including the important set item. So, on the display screen G1 of FIG. 5, the basic setting image 41, the original setting image 42 and the application setting image 43 are the images including the important set item. The attribute value corresponding to each of the images 41, 42 and 43 is defined "1." On the other hand, the logo image 44 and the start key 45 are images not including the important set item. The attribute value corresponding to each of the images 44 and 45 is defined as "0."

The error determination part 32 refers to the above-described image determination information 33, thereby specifying whether or not the important set item is included in the image in which the display error is detected based on the ID of the image in which the display error is detected. When the error determination part 32 determines that the image including the important set item is not being displayed as the result of the specification, the confirmation screen creation part 34 is put into operation. When the error determination part 32 determines that the image not including the important set item is not being displayed, the user may check all of at least one set value. So, a confirmation screen is not necessary to be displayed here. The confirmation screen creation part 34 is not put into operation.

The confirmation screen creation part 34 creates the confirmation screen to show the set value corresponding to each of at least one set item included in the image not being displayed on the display unit 14 at time of operation to press the start key 45 made by the user. To be more specific, the confirmation screen creation part 34 does not acquire the display screen to display on the display unit 14 from the web server 3 as the browser 30 does. The confirmation screen creation part 34 creates the display screen to display on the display unit 14 by internal process.

In the present preferred embodiment, all of at least one set value of the image processing device 2 is managed by the web server 3. More specifically, in response to the operation made to the operational panel 13 by the user, the browser 30 sends the request for screen D10 including the information such as the set value or the operation signal to the web server 3 as described above for each operation. The web server 3 manages the current set value of the image processing device 2 based on the set value or the operation signal received from the browser 30. As described above, when the current set value of the image processing device 2 is managed by the web server 3, the image processing device 2 needs to acquire the set value necessary for execution of the job from the web server 3 to execute the job. According to the present preferred embodiment, as operation to press the start key 45 for giving instructions on start of execution of the job is made by the user, the browser 30 sends a signal indicating that the start key 45 being pressed to the web server 3. The web server 3 then reports the set value corresponding to each set item necessary for execution of the job specified by the user to the image processing device 2. The confirmation screen creation part 34 creates the setting confirmation screen based on the set value corresponding to each set item received from the web server 3.

Figure 9:
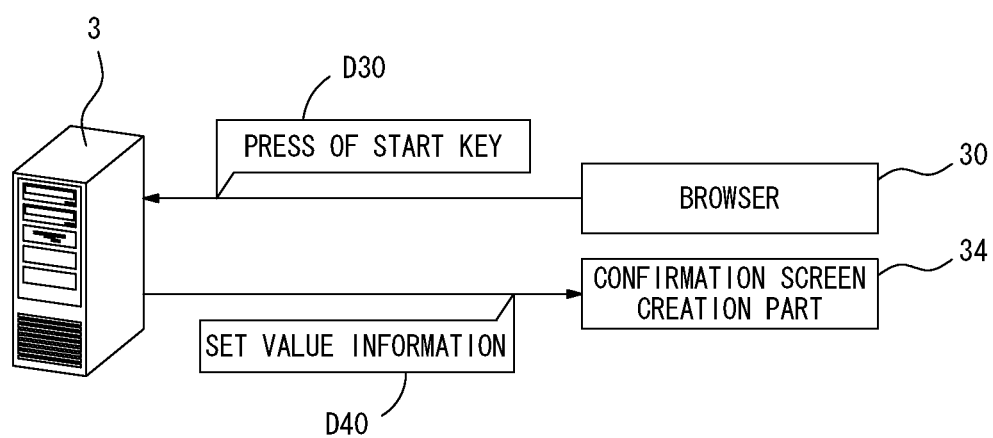
FIG. 9 conceptually shows data communication when a start key is pressed by the user.

FIG. 9 conceptually shows data communication when the start key 45 is pressed by the user. As detecting the operation to press the start key 45 made by the user, the browser 30 sends a notification of press of start key D30 to the web server 3. The web server 3 specifies the job executed in the image processing device 2, and extracts the current set value corresponding to each set item necessary for execution of the job. The web server 3 then generates set value information D40 including the current set value corresponding to each set item and transmits to the image processing device 2. The set value information D40 is not transmitted in a form of a display screen. The set value information D40 is transmitted in a form of simple data string with the set value corresponding to each set item arranged in a row. It is assumed that a relatively heavy load is placed on the web server 3 or the network 4. Even in this case, the set value information D40 of FIG. 9 is transmitted to the image processing device 2 more efficiently compared to the transmission of data such as the web page D20, the images D21 and D22 as shown in FIG. 4.

The confirmation screen creation part 34 receives the set value information D40 transmitted from the web server 3 and creates the setting confirmation screen based on each setting value included in the received set value information D40. The confirmation screen creation part 34 then outputs the setting confirmation screen thereby created to the screen change part 35. The confirmation screen creation part 34 may extract the set value of the set item corresponding to the image in which the display error is detected from the set value corresponding to each set item included in the set value information D40 and create the setting confirmation screen.

In response to receipt of the setting confirmation screen from the confirmation screen creation part 34, the screen change part 35 changes the display screen displayed on the display unit 14 of the operational panel 13 to the setting confirmation screen from the display screen received from the browser 30. The setting confirmation screen created by the confirmation screen creation part 34 is displayed on the display unit 14.

Figure 10:
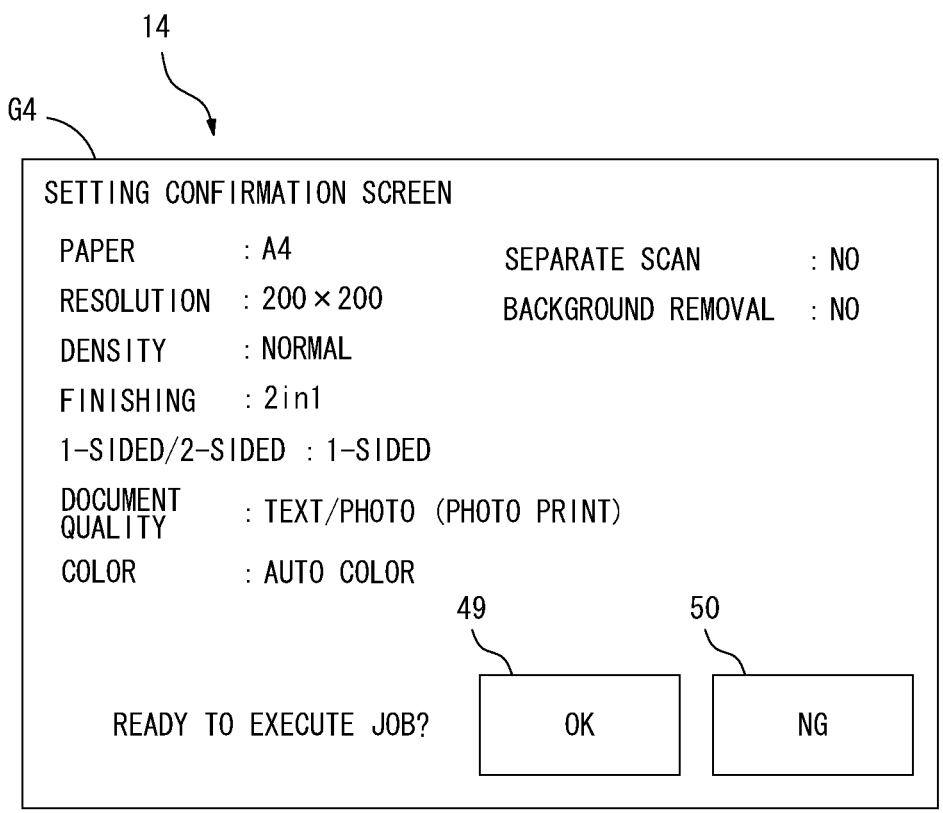
FIG. 10 shows an example of a setting confirmation screen created by a confirmation screen creation part and displayed on the display unit.

FIG. 10 shows an example of a setting confirmation screen G4 displayed on the display unit 14. The setting confirmation screen G4 shows the case when the operation to press the start key 45 is made by the user, for example, while the display screen G3 shown in FIG. 7 is being displayed on the display unit 14. To be more specific, the basic setting image 41 and the original setting image 42 including the important set item are not displayed on the display screen G3 of FIG. 7. So, the user has not checked the set value corresponding to each set item included in the basic setting image 41 and the original setting image 42 just before he or she makes the operation to press the start key 45. In such a case, the setting confirmation screen G4 as shown in FIG. 10 is created by the confirmation screen creation part 34 and displayed on the display unit 14. The set value corresponding to each set item for execution of the job is displayed on the setting confirmation screen G4. As a result, the user is allowed to check each set value prior to execution of the job being started in the image processing device 2.

As shown in FIG. 10, an OK key 49 and a NG key 50 are shown on the setting confirmation screen G4. After checking each set value displayed on the setting confirmation screen G4, the user operates the OK key 49 to execute the job. The user operates the NG key 50 to cancel execution of the job and make operation for another setting of the job. Therefore, the OK key 49 is for giving instructions on execution of the job with the setting confirmation screen G4 being displayed, and the NG key 50 is for making operation for another setting of the job.

As the OK key 49 is operated by the user, the screen change part 35 changes the display screen displayed on the display unit 14 back to the display screen received from the browser 30, and puts the job execution control part 36 into operation. The job execution control part 36 makes setting for execution of the job based on the set value information D40 received from the web server 3. Also, the job execution control part 36 drives necessary parts such as the scanner unit 16 or the printer unit 17, thereby controlling execution of the job specified by the user.

As the NG key 50 is operated by the user, the screen change part 35 changes the display screen displayed on the display unit 14 back to the display screen received from the browser 30. The screen change part 35 gives instructions to update the display screen to the browser 30 then. As a result, the browser 30 again acquires the display screen currently being displayed on the display unit 14 from the web server 3 and displays on the display unit 14. The image not being displayed is possible to be displayed normally with another automatic acquisition of the display screen. The browser 30 is again put into a state for receiving the operation to change the set value made by the user.

In the present preferred embodiment, as changing the display screen of the display unit 14 to the setting confirmation screen G4 as shown in FIG. 10, the screen change part 35 starts timing measurement. When operation to select one of the OK key 49 and the NG key 50 is not made by the user before a predetermined period of time elapses, execution of the job is started automatically. The predetermined period of time is set, for example, around a few seconds to a few dozen seconds. For the user who is used to the operation of the image processing device 2, for instance, he or she knows a default value corresponding to each setting item included in the basic setting image 41, the original setting image 42 or the application setting image 43 in most cases even when the image is not being displayed. It is assumed that such user is trying to execute the job with the default value. Even in this case, after operating the start key 45, the user needs to operate the OK key 49 on the displayed setting confirmation screen G4. It is burdensome for the user to make such operations. So, as described above, in response to the elapse of the predetermined period of time since the setting confirmation screen G4 is being displayed, execution of the job is started automatically. As a result, the burden of the operation may be reduced, and the operability may be improved.

It is assumed that at least one image contained in the display screen acquired from the web server 3 by the browser 30 is not displayed normally with the display screen being displayed on the display unit 14. As described above, according to the present preferred embodiment, in such a case, if the important set item is included in the undisplayed image, the set value of each set item corresponding to at least the undisplayed image is displayed as the setting confirmation screen G4 in response to the operation to press the start key 45 made by the user. The setting confirmation screen G4 is not acquired from the web server 3, and is created in the image processing device 2. Therefore the setting confirmation screen G4 is displayed normally even when the load is placed on the web server 3 or the network 4. The user is allowed to check each set value applied to execution of the job prior to the execution of the job being started in the image processing device 2.

Figure 11:
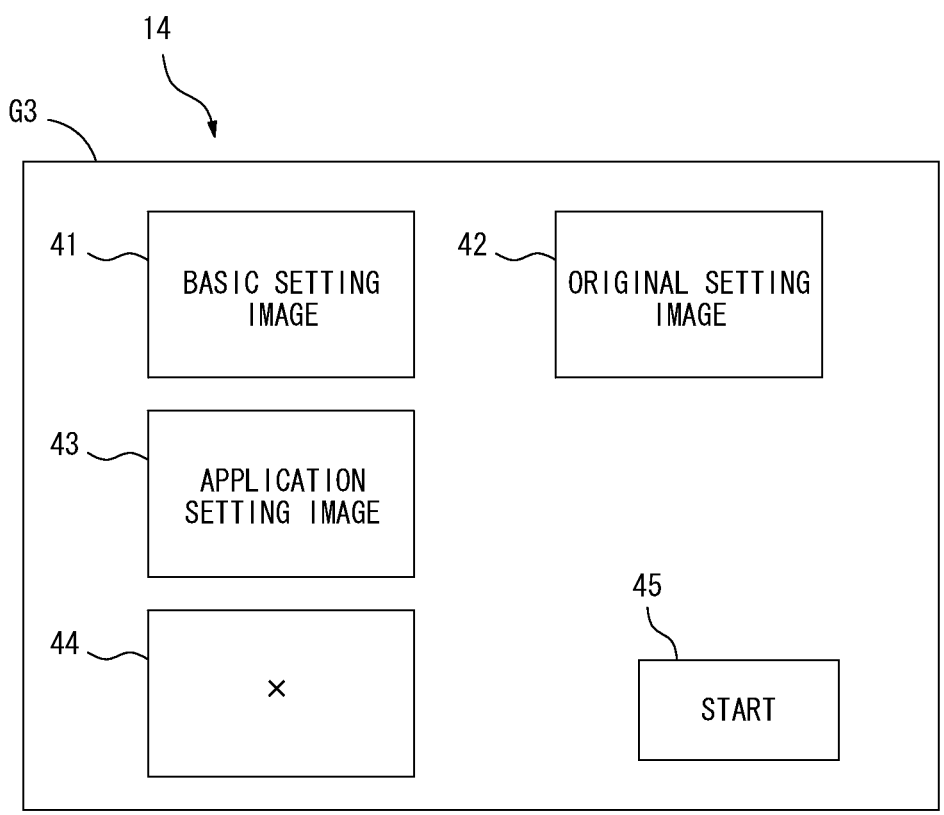
FIG. 11 shows an example of a display screen displayed on the display unit when a logo image is not received normally by the browser.

It is assumed, however, the important set item is not included in the undisplayed image. In this case, in the present preferred embodiment, the setting confirmation screen G4 is not displayed on the display unit 14 even if the user presses the start key 45. When, for example, the logo image 44 contained in the display screen G3 is not received normally as shown in FIG. 11, the display error is detected by the error detection part 31. The error determination part 32, however, determines that the undisplayed logo image 44 does not include the important set value. So, the confirmation screen creation part 34 is not put into operation, and the setting confirmation screen G4 is not created. In this case, in response to the operation to press the start key 45 made by the user, execution of the job is started immediately. It is assumed that the display error has been detected at time of operation to press the start key 45. Even in this case, if the set value corresponding to every set item may be checked by the user at time of the operation to press the start key 45, the setting confirmation screen G4 is not displayed. Therefore, the user is not necessary to make operation to select the OK key 49 or the NG key 50. The operability improves.

Figure 12:
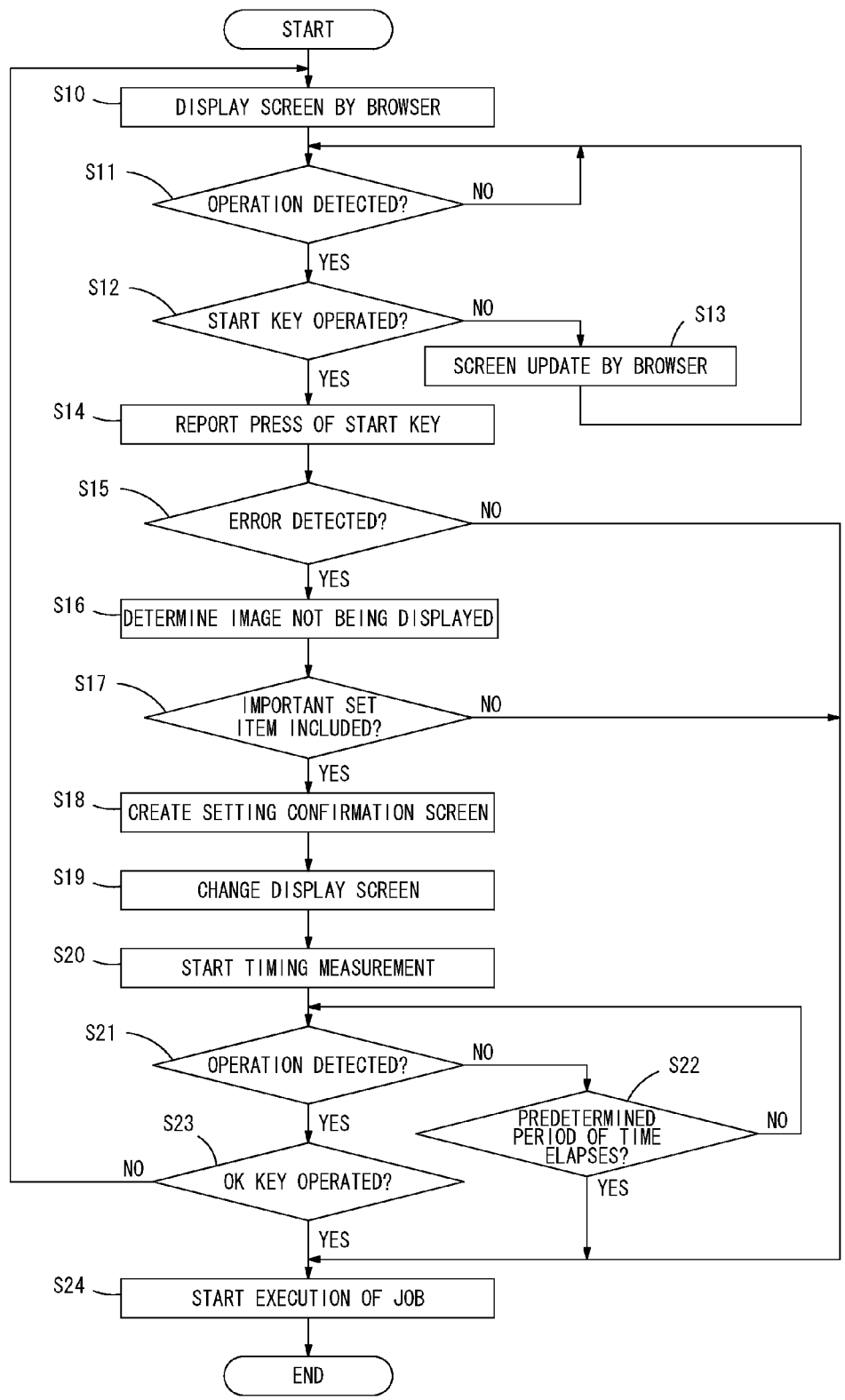
FIG. 12 is a flow diagram explaining the process sequence of a processing executed by the controller.

The detail of operation of the controller 10 is described next. FIG. 12 is a flow diagram explaining the process sequence of a processing executed by the controller 10. In response to the start of the processing, the controller 10 first activates the browser 30. The browser 30 acquires the display screen from the web server 3 and displays on the display unit 14 (step S10). The browser 30 is put into a waiting state until operation made by the user is detected (step S11). As the operation made by the user is detected (when a result of step S11 is YES), the browser 30 determines whether or not the operation made by the user is to press the start key 45 (step S12). If the operation made by the user is not to press the start key 45 (when a result of step S12 is NO), the browser 30 acquires the display screen corresponding to the user's operation from the web server 3 and updates the display screen of the display unit 14 (step S13). The browser 30 then returns to step S11. When setting operation made to the operational panel 13 by the user is repeatedly performed, the browser 30 repeats the process in step S11 to S13.

When the start key 45 is pressed by the user (when a result of step S12 is YES), the browser 30 sends the notification of press of start key D30 indicating that the start key 45 has been pressed to the web server 3 (step S14). The browser 30 then determines whether or not the display error is detected by the error detection part 31 (step S15). If the display error is not detected (when a result of step S15 is NO), execution of the job by the job execution control part 36 is started, and the process is completed (step S24).

If the display error is detected (when a result of step S15 is YES), the error determination part 32 is put into operation, and determines the image not being displayed (step S16). The error determination part 32 determines whether or not the important set item is included in the undisplayed image (step S17). As the important set item is not included (when a result of step S17 is NO), execution of the job by the job execution control part 36 is started, and the process is completed (step S24).

As the important set item is included in the undisplayed image (when a result of step S17 is YES), the confirmation screen creation part 34 is put into operation. The confirmation screen creation part 34 creates the setting confirmation screen G4 to display on the display unit 14 based on the set value information D40 received from the web server 3 (step S18).

As the screen change part 35 changes the display screen displayed on the display unit 14 from the display screen received from the browser 30 to the setting confirmation screen G4 received from the confirmation screen creation part 34, the setting confirmation screen G4 is displayed on the display unit 14 (step S19). As a result, the user is allowed to check each set value applied to execution of the job.

In response to the change of the display screen, the screen change part 35 starts timing measurement (step S20). The screen change part 35 determines whether or not the operation made by the user is detected (step S21). When the operation made by the user is not detected (when a result of step S21 is NO), the screen change part 35 determines whether or not the predetermined period of time has elapsed from the start of timing measurement (step S22). If the predetermined period of time has not elapsed (when a result of step S22 is NO), the screen change part 35 returns to step S21. The screen change part 35 repeatedly executes the process in step S21 and S22 until the operation made by the user is detected or the predetermined period of time elapses. After the predetermined period of time elapses (when a result of step S22 is YES), execution of the job by the job execution control part 36 is started, and the process is completed (step S24). When the operation made by the user is detected (when a result of step S21 is YES), the screen change part 35 determines whether or not the OK key 49 is operated (step S23). When the OK key 49 is operated (when a result of step S23 is YES), execution of the job by the job execution control part 36 is started, and the process is completed (step S24). When the NG key 50 is operated by the user (when a result of step S23 is NO), the execution of the job is canceled, and the process returns to step S10. The above-described process is then executed again, and operation to change settings made by the user is received.

As explained above, the image processing device 2 of the present preferred embodiment includes the browser 30, the error detection part 31, the confirmation screen creation part 34 and the screen change part 35. The browser 30 acquires the display screen from the web server 3 via the communication interface 18 and displays the acquired display screen on the display unit 14. The error detection part 31 detects occurrence of the display error of the image contained in the display screen acquired from the web server 3 by the browser 30 with the display screen being displayed on the display unit 14. The confirmation screen creation part 34 creates the setting confirmation screen G4 including the set value of each of at least one set item corresponding to the image in which the display error is detected when the display error is detected by the error detection part 31. The display change part 35 changes the display screen displayed on the display unit 14 from the display screen displayed by the browser 30 to the setting confirmation screen G4 created by the confirmation screen creation part 34 prior to start of execution of the job.

It is assumed that some or all of at least one image contained in the display screen displayed on the display unit 14 by the browser 30 is not displayed normally. According to the above-described configuration, even in such a case, the user is allowed to check each set value included in the undisplayed image prior to start of execution of the job in the image processing device 2. The output produced in a manner that the user does not satisfy may be prevented. The user is not necessary to repeatedly operate the update button for redisplay with the function of the browser 30 to check the set value of the image not being displayed. So, the operability is good. The confirmation screen creation part 34 does not acquire the setting confirmation screen G4 from the web server 3. Therefore, even when the heavy load is placed on the web server 3 or the network 4, the setting confirmation screen G4 may be created and displayed on the display unit 14. Even if the image contained in the display screen acquired from the web server 3 is not displayed normally, the user may easily check the set value of each set item corresponding to the image without another acquisition of the display screen from the web server 3.

The timing of creation of the setting confirmation screen G4 by the confirmation screen creation part 34 is substantially equal to the timing of detection of the instructions on execution of the job given by the user (that is the timing of press of the start key 45). Thus, the display screen of the display unit 14 is not changed suddenly to the setting confirmation screen G4 during user's setting operation to the operational panel 13. Besides, the setting confirmation screen G4 is considered to be displayed every time the display error of the image is detected in the display screen displayed by the browser 30. The display screen displayed on the display unit 14, however, is possible to be changed frequently between the display screen displayed by the browser 30 and the setting confirmation screen G4 while the heavy load is placed on the web server 3 or the network 4. The operability is extremely declined for the user. That is why the timing of creation of the setting confirmation screen G4 by the confirmation screen creation part 34 is set as described above. The display screen may be prevented from being changed frequently. In addition, the user is allowed to check the set value corresponding to each set item prior to start of execution of the job.

In the present preferred embodiment, the error determination part 32 determines whether or not the image in which the display error is detected includes the important set item when the display error is detected by the error detection part 31. The confirmation screen creation part 34 creates the setting confirmation screen G4 including the set value of each set item corresponding to the image in which the display error is detected when the image is determined to include the important set item by the error determination part 32. To be more specific, it is assumed that some of at least one image is not displayed on the display screen displayed on the display unit 14 by the browser 30. Even in such a case, the setting confirmation screen G4 is not displayed if the image not being displayed does not include the important set item. So, the setting confirmation screen G4 is displayed when the checking of the set value is necessary for the user. The setting confirmation screen G4 is not displayed when the checking of the set value is unnecessary for the user.

Moreover, according to the present preferred embodiment, as operation to the NG key 50 is detected by the manipulation input unit 15 with the setting confirmation screen G4 created by the confirmation screen creation part 34 being displayed on the display unit 14, the screen change part 35 changes the display screen displayed on the display unit 14 to the display screen displayed by the browser 30. At the same time, the browser 30 is caused to again acquire the display screen from the web server 3. So, when the user operated the NG key 50, the display screen is again acquired from the web server 3, and the display screen displayed on the display unit 14 is updated. As a result, the image not being displayed by then may be displayed normally. The user is allowed to make setting operation again smoothly.

In the present preferred embodiment, in response to operation made to the start key 45 by the user, the web server 3 receives the notification, and the set value corresponding to each of at least one set item for execution of the job is acquired from the web server 3. The confirmation screen creation part 34 extracts at least the set value of each set item corresponding to the image in which the display error is detected and creates the setting confirmation screen G4. Even when the set value of the image processing device 2 is managed by the web server 3, the confirmation screen creation part 34 is capable of creating the setting confirmation screen G4 including the set value of each set item corresponding to the image not being displayed.

As described above, even when at least one image contained in the display screen acquired from the web server is not displayed normally, the set value of the set item corresponding to the image may be displayed without another acquisition of the display screen from the web server. As a result, the user is allowed to check the set value of each set item prior to start of execution of the job.

MODIFICATIONS

While the present preferred embodiment of the present invention has been described above, the present invention is not limited to the present preferred embodiment. Various modifications may be applied to the present invention.

In the present preferred embodiment described above, the set value corresponding to each of at least one set item of the image processing device 2 is managed by the web server 3. The set value of the set item does not always have to be managed by the web server 3. The set value of the set item may be managed by the image processing device 2 internally. In such a case, the confirmation screen creation part 34 may read the set value managed inside of the image processing device 2 and create the setting confirmation screen G4.

Furthermore, in the present preferred embodiment described above, the error determination part 32 determines the image in which the display error is occurred. The confirmation screen creation part 34 then creates the setting confirmation screen G4 when the important set item is included in the image not being displayed. The error determination part 32, however, does not always have to be included. By way of example, if the display error is detected by the error detection part 31 at time of operation to press the start key 45 made by the user, the confirmation screen creation part 34 may create the setting confirmation screen G4 for every detection.

In the above-described present preferred embodiment, the display screen control device of the present invention is shown to be a device implementing the display screen control device in the image processing device 2 such as an MFP. The device capable of being applied each constituent part as the above-described display screen control device is not necessarily the image processing device 2 such as the MFP. To be more specific, each constituent part as the above-described display screen control device may be applied to a device other than the image processing device.

What is claimed is:

1. A display screen control device, comprising:
   a display part for displaying various types of information;
   a manipulation input part for detecting variety of input operations made by a user;
   a communication part for performing data communication with a web server;
   a browser for acquiring a display screen from said web server via said communication part and displaying the acquired display screen on said display part;
   an error detection part for detecting whether or not a display error of an image contained in the display screen acquired from said web server by said browser occurs with the display screen being displayed on said display part when an instruction on execution of a job given by the user is detected by said manipulation input part;
   a confirmation screen creation part for creating a setting confirmation screen including a set value of each of at least one set item corresponding to the image in which the display error is detected when the display error is detected by said error detection part; and a screen change part for changing the display screen displayed on said display part from the display screen displayed by said browser to the setting confirmation screen created by said confirmation screen creation part prior to start of execution of the job, wherein after changing the display screen displayed on said display part to the setting confirmation screen created by said confirmation screen creation part, said screen change part maintains the state of the display for a predetermined period of time.

2. The display screen control device according to claim 1, further comprising:

an error determination part for determining whether or not the image in which the display error is detected includes an important set item when the display error is detected by said error detection part, wherein said confirmation screen creation part creates the setting confirmation screen including the set value of each set item corresponding to the image in which the display error is detected when said error determination part determines that the image includes an important set item.

3. The display screen control device according to claim 1, further comprising:

a job execution control part for starting execution of the job when the instruction on execution of the job is detected by said manipulation input part with the setting confirmation screen created by said confirmation screen creation part being displayed on said display part.

4. The display screen control device according to claim 3, wherein said job execution control part starts execution of the job after the predetermined period of time elapses without the operation made by the user being detected by said manipulation input part with the setting confirmation screen created by said confirmation screen creation part being displayed on said display part.

5. The display screen device according to claim 3, wherein said screen change part changes the display screen displayed on said display part to the display screen displayed by said browser when the instruction on execution of the job is detected by said manipulation input part with the setting confirmation screen created by said confirmation screen creation part being displayed on said display part.

6. The display screen control device according to claim 1, wherein when an input operation made by the user is detected by said manipulation input part with the setting confirmation screen created by said confirmation screen creation part being displayed on said display part, said screen change part changes the display screen displayed on said display part to the display screen displayed by said browser, and causes said browser to again acquire the display screen from said web server.

7. The display screen control device according to claim 1, wherein when the instruction on execution of the job given by the user is detected by said manipulation input part, said communication part sends the instruction on execution of the job to said web server, and acquires the set value corresponding to each set item for execution of the job from said web server, and said confirmation screen creation part extracts the set value of each of at least one set item corresponding to the image in which the display error is detected from the set value corresponding to each set item acquired by said communication part and creates the setting confirmation screen.

8. A display screen control method, comprising the steps of:

(a) acquiring a display screen from a web server connected through a network and displaying the acquired display screen on a predetermined display part;

(b) detecting whether or not an instruction on execution of a job is given based on input operation made by a user;

(c) detecting whether or not a display error of an image contained in the display screen acquired from said web server is occurred with the display screen being displayed on said display part when the instruction on execution of the job given by the user is detected;

(d) creating a setting confirmation screen including a set value of each of at least one set item corresponding to the image in which the display error is detected when the display error of the image contained in the display screen is detected; and (e) changing the display screen displayed on said display part from the display screen acquired from said web server to the setting confirmation screen, wherein after the display screen displayed on said display part is changed to the setting confirmation screen created in said step (d), the state of the display is maintained for a predetermined period of time in said step (e).

9. The display screen control method according to claim 8, further comprising the step of:

(f) determining whether or not the image in which the display error is detected includes an important set item when the display error is detected in said step (a), wherein in said step (d), the setting confirmation screen including the set value of each set item corresponding to the image in which the display error is detected is created when the image is determined to include an important set item in said step (f).

10. The display screen control method according to claim 8, further comprising the step of:

(g) starting execution of the job when the instruction on execution of the job is detected in said step (b) with the setting confirmation screen created in said step (d) being displayed on said display part.

11. The display screen control method according to claim 10, wherein in said step (g), execution of the job is started after the predetermined period of time elapses without the operation made by the user being detected in said step (b) with the setting confirmation screen created in said step (d) being displayed on said display part.

12. The display screen control method according to claim 10, wherein the display screen displayed on said display part is changed to the display screen acquired from said web server when the instruction on execution of the job is detected with the setting confirmation screen being displayed on said display part.

13. The display screen control method according to claim 8, wherein in said step (e), when operation to make setting again is detected in said step (b) with the setting confirmation screen created in said step (d) being displayed on said display part, the display screen displayed on said display part is changed to the display screen displayed in said step (a), and said step (a) is caused to be executed again.

14. The display screen control method according to claim 8, further comprising the step of:
- (h) sending the instruction on execution of the job to said web server and acquiring the set value corresponding to each set item for execution of the job from said web server when the instruction on execution of the job given by the user is detected in said step (b), wherein
- in said step (d), the set value of each of at least one set item corresponding to the image in which the display error is detected is extracted from the set value corresponding to each set item acquired in said step (h) and the setting confirmation screen is created.

15. A non-transitory computer-readable recording medium on which a program is recorded, said program causing a computer to execute the steps of:
- (a) acquiring a display screen from a web server connected through a network and displaying the acquired display screen on a predetermined display part;
- (b) detecting whether or not an instruction on execution of a job is given based on input operation made by a user;
- (c) detecting whether or not a display error of an image contained in the display screen acquired from said web server is occurred with the display screen being displayed on said display part when the instruction on execution of the job given by the user is detected;
- (d) creating a setting confirmation screen including a set value of each of at least one set item corresponding to the image in which the display error is detected when the display error of the image contained in the display screen is detected; and
- (e) changing the display screen displayed on said display part from the display screen acquired from said web server to the setting confirmation screen,
- wherein after the display screen displayed on said display part is changed to the setting confirmation screen created in said step (d), the state of the display is maintained for a predetermined period of time in said step (e).

16. The non-transitory computer-readable recording medium according to claim 15, wherein said program causes the computer to further execute the step of:
- (f) determining whether or not the image in which the display error is detected includes an important set item when the display error is detected in said step (a), wherein
- in said step (d), the setting confirmation screen including the set value of each set item corresponding to the image in which the display error is detected is created when the image is determined to include an important set item in said step (f).

17. The non-transitory computer-readable recording medium according to claim 15, wherein said program causes the computer to further execute the step of:
- (g) starting execution of the job when the instruction on execution of the job is detected in said step (b) with the setting confirmation screen created in said step (d) being displayed on said display part.

18. The non-transitory computer-readable recording medium according to claim 17, wherein
- in said step (g), execution of the job is started after the predetermined period of time elapses without the operation made by the user being detected in said step (b) with the setting confirmation screen created in said step (d) being displayed on said display part.

19. The non-transitory computer-readable recording medium according to claim 17, wherein the display screen displayed on said display part is changed to the display screen acquired from said web server when the instruction on execution of the job is detected with the setting confirmation screen being displayed on said display part.

20. The non-transitory computer-readable recording medium according to claim 15, wherein
- in said step (e), when operation to make setting again is detected in said step (b) with the setting confirmation screen created in said step (d) being displayed on said display part, the display screen displayed on said display part is changed to the display screen displayed in said step (a), and said step (a) is caused to be executed again.

21. The non-transitory computer-readable recording medium according to claim 15, wherein said program causes the computer to further execute the step of:
- (h) sending the instruction on execution of the job to said web server and acquiring the set value corresponding to each set item for execution of the job from said web server when the instruction on execution of the job given by the user is detected in said step (b), wherein
- in said step (d), the set value of each of at least one set item corresponding to the image in which the display error is detected is extracted from the set value corresponding to each set item acquired in said step (h) and the setting confirmation screen is created.

* * * * *